US006248465B1

(12) United States Patent
Zhou et al.

(10) Patent No.: US 6,248,465 B1
(45) Date of Patent: Jun. 19, 2001

(54) COMPLEX OXIDE CERAMIC SINTERED BODY AND SOLID-ELECTROLYTE FUEL CELL COMPRISING THE SAME

(75) Inventors: Hua-bing Zhou, Kusatsu; Hiroaki Taira, Izumo, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/304,777

(22) Filed: May 4, 1999

(30) Foreign Application Priority Data

May 13, 1998 (JP) .................................................. 10-130414

(51) Int. Cl.$^7$ .............................. H01M 8/10; H01M 8/08
(52) U.S. Cl. ................................. 429/33; 429/40; 429/46
(58) Field of Search .................................. 429/33, 40, 46

(56) References Cited

U.S. PATENT DOCUMENTS

| 4,562,124 | * | 12/1985 | Ruka | 429/30 |
|---|---|---|---|---|
| 4,950,562 | * | 8/1990 | Yoshida et al. | 429/32 |
| 5,306,411 | * | 4/1994 | Mazanec et al. | 204/265 |
| 5,411,767 | * | 5/1995 | Soma et al. | 429/453 |
| 5,426,003 | * | 6/1995 | Spengler et al. | 429/27 |
| 5,604,048 | * | 2/1997 | Nishihara et al. | 429/44 |
| 5,747,184 | * | 5/1998 | Kurbjuhn et al. | 429/31 |
| 5,759,936 | * | 6/1998 | Christiansen et al. | 501/152 |
| 5,932,146 | * | 8/1999 | Kuo et al. | 252/521.1 |
| 5,958,304 | * | 9/1999 | Khandkar et al. | 252/519.15 |

FOREIGN PATENT DOCUMENTS

| 3-65517 | 3/1991 | (JP) . | | |
|---|---|---|---|---|
| 4-214069 | 8/1992 | (JP) . | | |
| 4-331764 | 11/1992 | (JP) . | | |
| 04331764 | * | 11/1992 | (JP) | 429/33 |
| 06081062 | * | 11/1992 | (JP) | 429/33 |
| 6-16471 | 1/1994 | (JP) . | | |
| 8-59341 | 3/1996 | (JP) . | | |
| 9-196098 | 7/1997 | (JP) . | | |

* cited by examiner

Primary Examiner—Tom Dunn
Assistant Examiner—L Edmondson
(74) Attorney, Agent, or Firm—Ostrolenk, Faber, Gerb & Soffen, LLP

(57) ABSTRACT

A complex oxide ceramic sintered body has a perovskite-type crystal structure and is represented by a general formula: $(La_{1-x}Sr_x)_a(Cr_{1-y-z}Al_yCo_z)_bO_3$, where $x+z \geq 0.06$; $z \geq 0.02$; $x+y+3z \leq 0.25$; $2x+3y+5z \geq 0.40$; $x+y \geq 0.12$; and $1.00 \leq b/a \leq 1.04$. The sintered body has a relative density of about 94% or more and the bending strength of about 15 kgf/mm$^2$ or more both at room temperature and at room temperature after the sintered compact is treated for 24 hours in an atmosphere of humidified hydrogen having an oxygen partial pressure of $10^{-18}$ atm at 1,000° C. The sintered body further has a lattice volumetric expansion coefficient of about 0.3% or less at room temperature after treated for 24 hours in an atmosphere of humidified hydrogen having an oxygen partial pressure of $10^{-18}$ atm at 1,000° C., an average thermal expansion coefficient in a range of about 9.8 to $11.0 \times 10^{-6}$ K$^{-1}$ at 30 to 1,000° C., and a phase transition temperature, from a rhombic system to a rhombohedral system, of about −20° C. or less.

12 Claims, No Drawings

COMPLEX OXIDE CERAMIC SINTERED BODY AND SOLID-ELECTROLYTE FUEL CELL COMPRISING THE SAME

BACKGROUND OF THE INVENTION

1. Field of the Invention

The present invention relates to a complex oxide ceramic sintered body, which is particularly used as a material for separators in solid-electrolyte fuel cells, and to a solid-electrolyte fuel cell using the same.

2. Description of the Related Art

Separators in solid-electrolyte fuel cells must be highly conductive, dense and stable in both oxidizing and reducing atmospheres. The separators must also have a thermal expansion coefficient close to that of yttria-stabilized-zirconia (hereinafter referred to as "YSZ") which is generally used as a solid electrolyte material.

Although lanthanum chromite (hereinafter referred to as "$LaCrO_3$") is known to be stable in a high-temperature oxidizing atmosphere and in a low oxygen partial pressure atmosphere, $LaCrO_3$ has poor sintering properties and insufficient denseness. Therefore, when $LaCrO_3$ is used for separators of solid-electrolyte fuel cells, the fuel gas and air are not completely separated from each other, which is not satisfactory. Additionally, since $LaCrO_3$ has a significantly low thermal expansion coefficient in comparison with the thermal expansion coefficient (10.0 to $11.0 \times 10^{-6}$ $K^{-1}$) of YSZ used as a solid electrolyte, bonded sections are easily separated because of the difference in volumetric change during heating and cooling. Moreover, $LaCrO_3$ does not have satisfactory conductivity.

Ceramics in which the site of La in $LaCrO_3$ is partially substituted by an alkali metal such as Ca or Sr, and in which the site of Cr is partially substituted by a transition metal such as Co, Ni, Cu, Zn, Fe or Mn, are disclosed as perovskite-type oxides which are highly conductive and are easily sintered (refer to Japanese Unexamined Patent Publications Nos. 3-65517, 4-214069, 4-331764, and 6-16471). However, ceramics sintered bodies having these compositions expand in a low oxygen partial pressure atmosphere and are unstable because of a decrease in strength, and thus warping may occur in cells or failure may be caused by small stresses if used under operating conditions in solid-electrolyte fuel cells.

The stability of the ceramic sintered bodies in a low oxygen partial pressure atmosphere is improved by controlling the amount of an alkali metal (for example, Ca or Sr) which partially substitutes the La site and the amount of metallic elements (at least one of Co and Ni, and at least one of Al and Mg) which partially substitute the Cr site, as disclosed in Japanese Unexamined Patent Publication No. 8-59341. However, this ceramic requires a sintering temperature of 1,750° C. or more, and the phase transition temperature thereof has not been examined. Therefore, when the ceramic sintered body is used as a separator in a solid-electrolyte fuel cell, contact failure with the solid-electrolyte material or other components, deformation or the like may occur because of volumetric change due to the phase transitions during repeated heating and cooling.

The phase transition temperature of the ceramic sintered body is decreased to 25° C. or less by partially substituting the La site by an alkali metal (for example, Ca or Sr) and by partially substituting the Cr site by Al only, as disclosed in Japanese Unexamined Patent Publication No. 9-196098. With respect to this ceramic, however, a phase transition temperature of 25° C. is not sufficient in consideration of use and transportation in winter and in cold areas, and a much lower phase transition temperature is desirable. Additionally, it is believed that the thermal expansion coefficient of the ceramic sintered body is not brought close to the thermal expansion coefficient of YSZ used as a solid electrolyte, and thus bonded sections may separate due to differences in volumetric changes during heating and cooling. Moreover, stability in an atmosphere of low oxygen partial pressure has not been fully examined.

SUMMARY OF THE INVENTION

Accordingly, it is an object of the present invention to solve the problems described above and to provide a $LaCrO_3$-based complex oxide ceramic sintered body which has high sintering density, high strength stability in a low oxygen partial pressure atmosphere, a phase transition temperature of 0° C. or below and a thermal expansion coefficient which is about the same as that of YSZ, and also to provide a solid-electrolyte fuel cell having excellent operating characteristics.

The complex oxide ceramic sintered body has a perovskite-type crystal structure and is represented by a general formula: $(La_{1-x}Sr_x)_a(Cr_{1-y-z}Al_yCo_z)_bO_3$, where $x+z \geq 0.06$; $z \geq 0.02$; $x+y+3z \leq 0.25$; $2x+3y+5z \geq 0.40$; $x+y \geq 0.12$; and $1.00 \leq b/a \leq 1.04$. The sintered body has a relative density of about 94% or more and a bending strength of about 15 $kgf/mm^2$ or more both at room temperature and at room temperature after the sintered compact is treated for 24 hours in an atmosphere of humidified hydrogen having an oxygen partial pressure of $10^{-18}$ atm at 1,000° C. The sintered body further has a lattice volumetric expansion coefficient of about 0.3% or less at room temperature after treated for 24 hours in an atmosphere of humidified hydrogen having an oxygen partial pressure of $10^{-18}$ atm at 1,000° C., an average thermal expansion coefficient in a range of about 9.8 to $11.0 \times 10^{-6}$ $K^{-1}$ at 30 to 1,000° C., and a phase transition temperature from a rhombic system to a rhombohedral system of about −20° C. or less.

According to the present invention, it is possible to obtain a $LaCrO_3$-based complex oxide ceramic sintered body which has high sintering density, high stability in a low oxygen partial pressure atmosphere at high temperatures, a low phase transition temperature, and a thermal expansion coefficient substantially the same as that of the YSZ solid electrolyte.

Accordingly, by using a complex oxide ceramic sintered body in accordance with the present invention as a practical material for a separator in a solid-electrolyte fuel cell or the like, a solid-electrolyte fuel cell having a long operating life in a general environment as well as in winter and in cold areas and having excellent operating characteristics can be obtained.

For the purpose of illustrating the invention, there is described below several forms which are presently preferred, it being understood, however, that the invention is not limited to the precise arrangements and instrumentalities shown.

DETAILED DESCRIPTION OF PREFERRED EMBODIMENTS

The inventors of the present invention have found that a $LaCrO_3$-based oxide obtained by partially substituting the La site of $LaCrO_3$ by Sr, by partially substituting the Cr site by Al and Co, and by controlling substitution amounts (x, y, and z) of the individual metallic elements and the amount ratio b/a between atoms located in the B site and atoms being located in the A site in the perovskite crystal structure ($ABO_3$) can shape a dense sintered body at relatively low temperatures, and that the obtained sintered body is stable in high-temperature air and in a low oxygen partial pressure atmosphere. It has been further found that the stability of the sintered body in high-temperature air and in a reducing atmosphere is greatly improved by controlling the types and substitution amounts of the individual constituents substituted and dissolved in the sintered compact within specific ranges, respectively, and by setting the relative density of the sintered compact, bending strength before and after reduction treatment, coefficient of lattice volumetric expansion due to reduction treatment, thermal expansion coefficient and phase transition temperature within given ranges, respectively.

The complex oxide ceramic sintered body in accordance with the present invention has a perovskite-type crystal structure represented by a general formula: $(La_{1-x}Sr_x)_a(Cr_{1-y-z}Al_yCo_z)_bO_3$, where $x+z \geq 0.06$, $z \geq 0.02$, $x+y+3z \leq 0.25$, $2x+3y+5z \geq 0.40$, $x+y \geq 0.12$ and $1.00 \leq b/a \leq 1.04$. The complex oxide ceramic sintered body has a relative density of about 94% or more and the bending strength of about 15 kgf/mm$^2$ or more both at room temperature and at room temperature after the sintered compact is treated for 24 hours in an atmosphere of humidified hydrogen having an oxygen partial pressure of $10^{-18}$ atm at 1,000° C.

The sintered body exhibits a lattice volumetric expansion coefficient of about 0.3% or less at room temperature after treated for 24 hours in an atmosphere of humidified hydrogen having an oxygen partial pressure of $10^{-18}$ atm at 1,000° C. and an average thermal expansion coefficient in a range of about 9.8 to $11.0 \times 10^{-6}$ K$^{-1}$ at 30 to 1,000° C. The phase transition temperature of the sintered body, from a rhombic system to a rhombohedral system, is about −20° C. or less.

The reasons for limiting various parameters within the aforementioned ranges will be explained hereinafter.

A $LaCrO_3$-based complex oxide ceramic sintered body according to the present invention basically has a perovskite-type crystal structure, the La site is partially substituted by Sr and the Cr site is partially substituted by Al and Co. The Sr amount substituted affects all sintering properties, strength, expansion due to reduction, thermal expansion and phase transition. Although sintering properties improve and the phase transition temperature decreases as the Sr amount substituted increases, if the amount is too large, lattice volumetric expansion increases due to reduction, and strength decreases due to reduction.

Co decreases the vapor pressure of chromium oxide and suppresses evaporation thereof by partially substituting the Cr site in $LaCrO_3$, and thus a dense sintered compact can be obtained. A very small amount of Co substituted increases the thermal expansion coefficient of the sintered compact close to the thermal expansion coefficient of YSZ. However, if the amount substituted is too large, like that of the Sr amount substituted, lattice volumetric expansion increases due to reduction and strength decreases due to reduction.

The ionic radius (0.55 angstrom) of Al is smaller than the ionic radius (0.615 angstrom) of Cr, and by substituting Al for Cr, the tolerance factor of the perovskite structure increases, and thus the transition temperature from a rhombic system to a rhombohedral system can be decreased. Although Al increases the thermal expansion coefficient of $LaCrO_3$, if the amount substituted is too large, like that of the Sr and Co amounts substituted, lattice volumetric expansion increases due to reduction and strength decreases due to reduction.

Sintering properties are affected by the Sr and Co amounts substituted and are not greatly affected by the Al amount substituted. In particular, the Co amount substituted greatly affects sintering properties, and z must be about 0.02 or more. If the amount is decreased excessively, sintering properties deteriorate. The sum of the Sr and Co amounts substituted also affects sintering properties, and x+z must be about 0.06 or more.

Strength before reduction treatment is affected by density, and strength after reduction treatment is affected by a coefficient of lattice volumetric expansion.

Expansion in a low oxygen partial pressure atmosphere is affected by the Sr, Al and Co amounts substituted. The effect of the Co amount substituted is approximately three times as large as the effect of the other two elements (Sr and Al), and the sum of the Sr and Al amounts substituted and three times the Co amount substituted, that is, x+y+3z, must be 0.25 or less. If this amount is too large, the coefficient of lattice volumetric expansion in an atmosphere of low oxygen partial pressure increases, resulting in warping.

The thermal expansion coefficient is affected by the Sr, Al and Co amounts substituted, and the effect ratio is approximately 2:3:5. The sum of two times the Sr amount substituted, three times the Al amount substituted and five times the Co amount substituted, that is, 2x+3y+5z, must be about 0.40 or more. If this amount is too small, the thermal expansion coefficient cannot be brought close to that of YSZ which is a typical solid electrolyte material.

The phase transition temperature is affected by the Sr and Al amounts substituted, and the effects of both are substantially the same. The sum of the Sr and Al amounts substituted, that is, x+y, must be about 0.12 or more. If this amount is too small, the phase transition temperature exceeds about −20° C., and when use and transportation in winter and in cold areas are taken into consideration, contact failure with a solid-electrolyte material or other components, deformation or the like may occur because of volumetric change due to phase transitions during repeated heating and cooling.

In a sintered compact in accordance with the present invention, an allowable ratio b/a between the Cr site and the La site in $LaCrO_3$ ranges from about 1.00 to 1.04. If b/a is within this range, the chromium compound is segregated in the grain boundaries of the sintered compact and inhibits grain growth during sintering, and thus strength of the sintered compact can be improved. However, if b/a is below about 1.00, although sintering properties improve, $La_2O_3$ in addition to $LaCrO_3$ is segregated in the grain boundaries of the sintered compact, resulting in brittleness even in air, which is disadvantageous. If the b/a value exceeds about 1.04, sintering properties deteriorate, which is also disadvantageous.

As to the relative density, the permeability of gas increases when the relative density of the sintered compact is less than about 94%. Therefore, if the sintered compact is used as a separator in a solid-electrolyte fuel cell, one side of the separator is exposed in a high oxygen partial pressure atmosphere such as in high-temperature air, and the other side of the separator is exposed in a low oxygen partial pressure atmosphere such as in high-temperature hydrogen, and thereby both gases are locally mixed and burned and non-uniform distribution of temperature is generated, resulting in a deterioration in generating characteristics.

The desired density can be obtained by firing at high temperatures. In order to achieve a relative density of about 94% or more by firing in a commonly used electric furnace (maximum operating temperature: 1,650° C.), the amount of elements substituted in the general formula, i.e., x+z is set at about 0.06 or more and z is set at about 0.02 or more.

As to the strength of the sintered body, when a complex oxide ceramic is used as a separator in a solid-electrolyte fuel cell, the strength of the sintered compact must be 8 kgf/mm$^2$ or more in order to withstand the internal stresses in the sintered compact in view of operating temperatures and atmospheres (Proceedings of the Fourth International Symposium on Solid Oxide Fuel Cells, IV, pp. 924–933, 1995).

The complex oxide ceramic in the present invention is used as a material for solid-electrolyte fuel cells and in order to secure adequate strength for a long service life, the sintered compact must have a bending strength at room temperature of about 15 kgf/mm$^2$ or more. When the sintered compact is used as a separator in a solid-electrolyte fuel cell and is exposed in a low oxygen pressure atmosphere such as in high-temperature humidified hydrogen, satisfactory strength is also required under such an atmosphere. Therefore, the bending strength at room temperature of the sintered compact after treatment is performed for 24 hours in an atmosphere of humidified hydrogen having an oxygen partial pressure of $10^{-18}$ atm at 1,000° C. must be about 15 kgf/mm$^2$ or more.

The relative density of the sintered compact is important for strength prior to reduction, and the strength can be achieved by setting the amounts of elements substituted, i.e., x+z at about 0.06 or more and z at about 0.02 or more in the general formula. The coefficient of lattice volumetric expansion of the sintered compact is important for strength after reduction, and the strength can be achieved by setting the amounts of elements substituted, i.e., x+y+3z at about 0.25 or less in the general formula.

As to the lattice volumetric expansion coefficient, when a complex oxide ceramic sintered compact in accordance with the present invention is used, for example, as a separator in a solid-electrolyte fuel cell, with both surfaces being exposed in different atmospheres at 1,000° C., that is, one surface being exposed to hydrogen gas and the other surface being exposed to air, expansion of the crystal lattices occurs if it is exposed to low oxygen partial pressure because of oxygen defects and changes in the number of Cr valences. Thereby, the sintered compact is elongated, resulting in deformation or cracking of the sintered compact.

For stable use preventing the above, in view of the stress on the sintered compact in high temperatures, the sintered compact must have a coefficient of lattice volumetric expansion of about 0.3% or less after treatment is performed for 24 hours in an atmosphere of humidified hydrogen having an oxygen partial pressure of $10^{-18}$ atm at 1,000° C. (Proceedings of the First Symposium on Fuel Cells, pp. 224–249, 1994). If the coefficient of lattice volumetric expansion exceeds about 0.3%, deformation or cracking may occur, resulting in a deterioration in durability. By setting the amounts of elements substituted in the general formula, i.e., x+y+3z at about 0.25 or less, the coefficient of lattice volumetric expansion can be decreased to about 0.3% or less.

The coefficient of lattice volumetric expansion is derived from a lattice volume $V_0$ of the sintered compact at room temperature before heat treatment and the lattice volume V of the sintered compact at room temperature after treatment is performed for 24 hours in an atmosphere of humidified hydrogen having an oxygen partial pressure of $10^{-18}$ atm at 1,000° C., according to the following equation.

Coefficient of lattice volumetric expansion=$\{(V-V_0)/V_0\}\times 100$

As to the average thermal expansion coefficient, since a separator in a solid-electrolyte fuel cell has a different thermal expansion coefficient from that of other components, in particular, that of YSZ generally used as a solid electrolyte, bonded sections in cells may be separated during repeated heating and cooling. Although it is possible to mix a material having a low thermal expansion coefficient such as alumina ($Al_2O_3$) in zirconia ($ZrO_2$) as a major constituent of a solid electrolyte so that the thermal expansion coefficient of the solid electrolyte is reduced and brought close to the thermal expansion coefficient of the separator, the addition of alumina to the solid electrolyte also leads to an increase in resistance. The present invention is aimed at bringing the thermal expansion coefficient of a $LaCrO_3$-based ceramic used for a separator close to that of YSZ as a solid electrolyte. For that purpose, the thermal expansion coefficient must be about $9.8\times10^{-6}$ $K^{-1}$ at the minimum.

The thermal expansion coefficient described above can be achieved by setting the amounts of the elements substituted, i.e., 2x+3y+5z, at 0.40 or more in the general formula.

As to the phase transition temperature, the crystal system changes in a sintered body having a $LaCrO_3$-based perovskite-type crystal structure from the low-temperature-type rhombic system to the high-temperature-type rhombohedral system as the temperature increases. Since the rhombic system has a larger lattice volume, a lattice volumetric change occurs during heating and cooling in response to the phase transition.

The complex oxide ceramic sintered compact in the present invention must have a phase transition temperature of about −20° C. or less. If the phase transition temperature increases, when the sintered compact is used as a separator in a solid-electrolyte fuel cell, bonded sections between the sintered compact and other components may be separated or deformed during repeated heating and cooling under use in winter and in cold areas.

Such a phase transition temperature can be achieved by setting the amounts of elements substituted in the general formula, i.e., x+y, at about 0.12 or more.

Hereinafter, more specific examples of the present invention will be explained in detail.

EXAMPLES 1 THROUGH 13

Powders of materials were weighed so that compositions of the individual sample numbers shown in Tables 1 and 2 were satisfied, wet mixing was performed in the presence of alcohol followed by drying, and preliminary firing was performed in air at 1,200° C. for 10 hours. The powders of materials were selected according to the compositions from $La_2O_3$, $SrCO_3$, $Cr_2O_3$, $CoO$ and $Al_2O_3$ and carbonates of the metals, each having a purity of 99.5% or more.

TABLE 1

| Sample Number | Composition | Firing conditions (temp.; hrs retained) |
|---|---|---|
| Example 1 | $La_{0.95}Sr_{0.05}Cr_{0.85}Al_{0.13}Co_{0.02}O_3$ | 1650° C., 10 hrs retained |
| Example 2 | $La_{0.95}Sr_{0.05}Cr_{0.90}Al_{0.08}Co_{0.02}O_3$ | 1650° C., 15 hrs retained |
| Example 3 | $La_{0.91}Sr_{0.09}Cr_{0.93}Al_{0.05}Co_{0.02}O_3$ | 1650° C., 10 hrs retained |
| Example 4 | $La_{0.96}Sr_{0.04}Cr_{0.88}Al_{0.09}Co_{0.03}O_3$ | 1600° C., 10 hrs retained |
| Example 5 | $La_{0.93}Sr_{0.07}Cr_{0.91}Al_{0.06}Co_{0.03}O_3$ | 1600° C., 10 hrs retained |
| Example 6 | $La_{0.96}Sr_{0.04}Cr_{0.86}Al_{0.12}Co_{0.02}O_3$ | 1650° C., 10 hrs retained |
| Example 7 | $La_{0.92}Sr_{0.08}Cr_{0.91}Al_{0.06}Co_{0.03}O_3$ | 1650° C., 10 hrs retained |

TABLE 1-continued

| Sample Number | Composition | Firing conditions (temp.; hrs retained) |
|---|---|---|
| Example 8 | $La_{0.95}Sr_{0.05}Cr_{0.86}Al_{0.11}Co_{0.03}O_3$ | 1600° C., 10 hrs retained |
| Example 9 | $La_{0.95}Sr_{0.05}Cr_{0.91}Al_{0.07}Co_{0.02}O_3$ | 1650° C., 15 hrs retained |
| Example 10 | $La_{0.96}Sr_{0.04}(Cr_{0.86}Al_{0.11}Co_{0.03})_{1.01}O_3$ | 1650° C., 10 hrs retained |
| Example 11 | $La_{0.95}Sr_{0.05}(Cr_{0.905}Al_{0.07}Co_{0.025})_{1.02}O_3$ | 1650° C., 10 hrs retained |
| Example 12 | $La_{0.95}Sr_{0.05}(Cr_{0.86}Al_{0.12}Co_{0.02})_{1.02}O_3$ | 1650° C., 10 hrs retained |
| Example 13 | $La_{0.93}Sr_{0.07}(Cr_{0.87}Al_{0.11}Co_{0.02})_{1.04}O_3$ | 1650° C., 20 hrs retained |
| Comparative Example 1 | $La_{0.96}Sr_{0.04}Cr_{0.94}Al_{0.02}Co_{0.04}O_3$ | 1650° C., 10 hrs retained |
| Comparative Example 2 | $La_{0.90}Sr_{0.10}Cr_{0.86}Al_{0.12}Co_{0.02}O_3$ | 1650° C., 8 hrs retained |
| Comparative Example 3 | $La_{0.96}Sr_{0.04}Cr_{0.90}Al_{0.10}O_3$ | 1650° C., 15 hrs retained |
| Comparative Example 4 | $La_{0.92}Sr_{0.08}Cr_{0.85}Al_{0.13}Co_{0.02}O_3$ | 1650° C., 8 hrs retained |
| Comparative Example 5 | $La_{0.90}Sr_{0.10}Cr_{0.96}Al_{0.02}Co_{0.02}O_3$ | 1650° C., 15 hrs retained |
| Comparative Example 6 | $La_{0.95}Sr_{0.05}Cr_{0.91}Al_{0.06}Co_{0.03}O_3$ | 1650° C., 6 hrs retained |
| Comparative Example 7 | $La_{0.93}Sr_{0.07}Cr_{0.86}Al_{0.11}Co_{0.03}O_3$ | 1650° C., 6 hrs retained |
| Comparative Example 8 | $La_{0.96}Sr_{0.04}Cr_{0.87}Al_{0.12}Co_{0.01}O_3$ | 1650° C., 20 hrs retained |
| Comparative Example 9 | $La_{0.94}Sr_{0.06}Cr_{0.88}Al_{0.08}Co_{0.04}O_3$ | 1600° C., 10 hrs retained |
| Comparative Example 10 | $La_{0.95}Sr_{0.05}(Cr_{0.90}Al_{0.07}Co_{0.03})_{1.05}O_3$ | 1650° C., 20 hrs retained |
| Comparative Example 11 | $La_{0.93}Sr_{0.07}(Cr_{0.86}Al_{0.12}Co_{0.02})_{0.99}O_3$ | 1600° C., 5 hrs retained |

TABLE 2

| Sample Number | x + z | z | x + y + 3z | 2x + 3y + 5z | x + y | b/a |
|---|---|---|---|---|---|---|
| Example 1 | 0.07 | 0.02 | 0.24 | 0.59 | 0.18 | 1.00 |
| Example 2 | 0.07 | 0.02 | 0.19 | 0.44 | 0.13 | 1.00 |
| Example 3 | 0.11 | 0.02 | 0.20 | 0.43 | 0.14 | 1.00 |
| Example 4 | 0.07 | 0.03 | 0.22 | 0.50 | 0.13 | 1.00 |
| Example 5 | 0.10 | 0.03 | 0.22 | 0.47 | 0.13 | 1.00 |
| Example 6 | 0.06 | 0.02 | 0.22 | 0.54 | 0.16 | 1.00 |
| Example 7 | 0.11 | 0.03 | 0.23 | 0.49 | 0.14 | 1.00 |
| Example 8 | 0.08 | 0.03 | 0.25 | 0.58 | 0.16 | 1.00 |
| Example 9 | 0.07 | 0.02 | 0.18 | 0.41 | 0.12 | 1.00 |
| Example 10 | 0.07 | 0.03 | 0.24 | 0.56 | 0.15 | 1.01 |
| Example 11 | 0.075 | 0.025 | 0.195 | 0.435 | 0.12 | 1.02 |
| Example 12 | 0.07 | 0.02 | 0.23 | 0.56 | 0.17 | 1.02 |
| Example 13 | 0.09 | 0.02 | 0.24 | 0.57 | 0.18 | 1.04 |
| Comparative Example 1 | 0.08 | 0.04 | 0.18 | 0.34 | 0.06 | 1.00 |
| Comparative Example 2 | 0.12 | 0.02 | 0.28 | 0.66 | 0.22 | 1.00 |
| Comparative Example 3 | 0.04 | 0 | 0.14 | 0.38 | 0.14 | 1.00 |
| Comparative Example 4 | 0.10 | 0.02 | 0.27 | 0.65 | 0.21 | 1.00 |
| Comparative Example 5 | 0.12 | 0.02 | 0.18 | 0.36 | 0.12 | 1.00 |
| Comparative Example 6 | 0.08 | 0.03 | 0.20 | 0.43 | 0.11 | 1.00 |
| Comparative Example 7 | 0.10 | 0.03 | 0.27 | 0.62 | 0.18 | 1.00 |
| Comparative Example 8 | 0.05 | 0.01 | 0.19 | 0.49 | 0.16 | 1.00 |
| Comparative Example 9 | 0.10 | 0.04 | 0.26 | 0.56 | 0.14 | 1.00 |
| Comparative Example 10 | 0.08 | 0.03 | 0.21 | 0.46 | 0.12 | 1.05 |
| Comparative Example 11 | 0.09 | 0.02 | 0.25 | 0.60 | 0.19 | 0.99 |

As a result of X ray diffraction analysis of the $LaCrO_3$ powders obtained as described above, the existence of a second phase has not been observed. Thereby, it has been found that Sr, Al and Co are dissolved in the $LaCrO_3$ lattices having a perovskite structure.

The powders were subjected to dry pulverizing and powders having a mean particle diameter of 0.7 μm and a specific surface area of 6.5 to 7.5 $m^2$/g were obtained.

Next, slurries were prepared by adding a dispersing agent and forming assistants to the powders, and by using the slurries, green compacts having a size of 40×30×5 mm (bulk density: 3.70 to 3.79 $g/cm^{-3}$) were obtained by a dehydration process, and then sintering was performed in air under the conditions shown Table 1.

The sintered compacts obtained as described above were subjected to grinding by a diamond grinder and surface finishing. Characteristics of the samples were evaluated. The results are shown in Table 3.

TABLE 3

| Sample Number | Relative density (%) | Coeff. of lattice volumetric expansion (%) | Strength (kgf/$mm^2$) Before reduction | Strength (kgf/$mm^2$) After reduction | Thermal expansion coefficient (x $10^{-6}$ $K^{-1}$) | Phase transition Temperature (° C.) |
|---|---|---|---|---|---|---|
| Example 1 | 95 | 0.28 | 16.5 | 21.0 | 10.2 | −39 |
| Example 2 | 94 | 0.23 | 15.0 | 19.0 | 10.0 | −30 |
| Example 3 | 97 | 0.24 | 16.0 | 22.0 | 10.1 | −25 |
| Example 4 | 96 | 0.26 | 15.5 | 20.0 | 10.3 | −28 |
| Example 5 | 98 | 0.25 | 16.5 | 22.0 | 10.2 | −26 |
| Example 6 | 94 | 0.30 | 16.0 | 22.0 | 10.1 | −32 |
| Example 7 | 96 | 0.29 | 17.0 | 17.0 | 10.0 | −30 |
| Example 8 | 97 | 0.30 | 16.0 | 20.0 | 10.3 | −30 |
| Example 9 | 94 | 0.24 | 16.0 | 20.0 | 10.0 | −23 |
| Example 10 | 95 | 0.24 | 16.5 | 20.0 | 10.4 | −30 |
| Example 11 | 94 | 0.23 | 16.0 | 21.0 | 9.9 | −20 |
| Example 12 | 97 | 0.26 | 17.0 | 22.0 | 10.1 | −37 |
| Example 13 | 94 | 0.19 | 15.0 | 16.5 | 9.8 | −32 |
| Comparative Example 1 | 95 | 0.29 | 16.0 | 16.0 | 9.6 | 85 |
| Comparative Example 2 | 95 | 0.40 | 16.0 | 5.0 | 10.2 | −42 |
| Comparative Example 3 | 80 | 0.25 | 12.0 | 12.0 | 9.8 | −30 |
| Comparative Example 4 | 95 | 0.34 | 17.0 | 10.0 | 10.1 | −37 |
| Comparative Example 5 | 94 | 0.26 | 15.0 | 15.0 | 9.6 | −22 |
| Comparative Example 6 | 94 | 0.28 | 15.0 | 21.0 | 9.9 | −18 |
| Comparative Example 7 | 94 | 0.40 | 15.5 | 4.0 | 10.4 | −35 |
| Comparative Example 8 | 86 | 0.22 | 10.0 | 15.0 | 10.2 | −25 |
| Comparative Example 9 | 97 | 0.33 | 20.0 | 10.0 | 10.7 | −20 |
| Comparative Example 10 | 90 | 0.25 | 11.0 | 18.0 | 9.9 | −20 |
| Comparative Example 11 | 96 | 0.33 | 7.0 | 0 | 10.3 | −37 |

The coefficient of lattice volumetric expansion is derived from a lattice constant measured at room temperature before and after treatment is performed for 24 hours in an atmosphere of humidified hydrogen having an oxygen partial pressure of $10^{-18}$ atm at 1,000° C. The thermal expansion coefficient is a mean value in air at 30 to 1,000° C. The bending strength is a value measured at room temperature before and after treatment is performed for 24 hours in an atmosphere of humidified hydrogen having an oxygen partial pressure of $10^{-18}$ atm at 1,000° C. The phase transition temperature is a value measured in air by differential scanning calorimetry.

COMPARATIVE EXAMPLES 1 THROUGH 11

Powders of materials were weighed so that compositions of the individual sample numbers shown in Tables 1 and 2 were satisfied, and sintered compacts, otherwise fabricated in a manner similar to that for the Examples, were subjected to abrasive processing, and then characteristics were evaluated. The results are shown in Table 3.

As is clear from Table 3, with respect to all the sintered compacts in Examples 1 through 13 having proper amounts of elements substituted and proper ratios of atoms located in the B site in the perovskite-type crystal structure to atoms located in the A site, the relative density was high, the coefficient of lattice volumetric expansion, thermal expansion coefficient and phase transition temperature were within a preferable range, and the strength before and after reduction treatment was excellent.

In contrast with the Examples, since the amounts in the Comparative Examples of the elements substituted or ratios of atoms located in the B site in the perovskite-type crystal structure to atoms located in the A site deviate from designated values or ranges, the desired effects are not obtained. In the sintered compact in Comparative Example 1, although the relative density was high and the strength and coefficient of lattice volumetric expansion were within given ranges, the phase transition temperature of 85° C. was particularly high. In the sintered compacts in Comparative Examples 2 and 8, although the phase transition temperature was relatively low, the coefficient of lattice volumetric expansion increased and strength decreased when exposed to a low oxygen partial pressure, which was unsatisfactory. In the sintered compacts in Comparative Examples 3, 8, and 10, the relative density was not sufficient. In Comparative Examples 4, 7, and 9, the coefficient of lattice volumetric expansion was high and the strength after reduction was low. In Comparative Example 5, the thermal expansion coefficient was not satisfactory. In Comparative Example 6, the phase transition temperature was −18° C., which was not sufficient. In Comparative Example 11, cracks were observed on the surface of the sintered compact after heat treatment had been performed in an atmosphere of humidified hydrogen having an oxygen partial pressure of $10^{-18}$ atm at 1,000° C. and the strength was too low to be measured.

As described above, the complex oxide ceramic in accordance with the present invention has high sintering density, high stability in a low oxygen partial pressure atmosphere at high temperatures, a low phase transition temperature, and a thermal expansion coefficient the same as that of YSZ as a solid electrolyte. By using the complex oxide ceramic for a separator in a solid-electrolyte fuel cell, a fuel cell having excellent operating characteristics can be fabricated.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A complex oxide ceramic sintered body having a perovskite crystal structure and represented by the formula $(La_{1-x}Sr_x)_a(Cr_{1-y-z}Al_yCo_z)_bO_3$ wherein $x+z \geq 0.06$; $z \geq 0.02$; $x+y+3z \leq 0.25$; $2x+3y+5z \geq 0.40$; $x+y \geq 0.12$; and $1.00 \leq b/a \leq 1.04$; and wherein the sintered body has a relative density of about 94% or more;

a bending strength of about 15 kgf/mm$^2$ or more at room temperature both before and after being exposed for 24 hours to an atmosphere of humidified hydrogen having an oxygen partial pressure of $10^{-18}$ atm at 1,000° C.;

a coefficient of lattice volumetric expansion of 0.3% or less at room temperature after being exposed for 24 hours in an atmosphere of humidified hydrogen having an oxygen partial pressure of $10^{-18}$ atm at 1,000° C.;

an average thermal expansion coefficient at 30 to 1,000° C. in the range of about 9.8 to 11.0×10$^{-6}$ K$^{-1}$; and a phase transition temperature from a rhombic system to a rhombohedral system of about −20° C. or less.

2. A complex oxide ceramic sintered body according to claim 1 wherein x+z is 0.06 to 0.11; z is 0.02 to 0.04; x+y+3z is 0.18 to 0.25; 2x+3y+5z is 0.40 to 0.59; and x+y is 0.12 to 0.18.

3. A complex oxide ceramic sintered body according to claim 2 wherein $x+z \geq 0.07$; $x+y+3z \leq 0.24$; $2x+3y+5z \geq 0.41$; and $x+y \geq 0.13$.

4. A solid-electrolyte fuel cell having a complex oxide ceramic sintered body according to claim 3 as a separator.

5. A solid-electrolyte fuel cell having a complex oxide ceramic sintered body according to claim 2 as a separator.

6. A solid-electrolyte fuel cell having a complex oxide ceramic sintered body according to claim 1 as a separator.

7. A solid-electrolyte fuel cell comprising a solid electrolyte and having a separator comprising a complex oxide ceramic sintered body according to claim 1 bonded thereto.

8. A solid-electrolyte fuel cell according to claim 7 wherein the solid electrolyte comprises yttria-stabilized zirconia.

9. A solid-electrolyte fuel cell comprising a solid electrolyte and having a separator comprising a complex oxide ceramic sintered body according to claim 2 bonded thereto.

10. A solid-electrolyte fuel cell according to claim 9 wherein the solid electrolyte comprises yttria-stabilized zirconia.

11. A solid-electrolyte fuel cell comprising a solid electrolyte and having a separator comprising a complex oxide ceramic sintered body according to claim 3 bonded thereto.

12. A solid-electrolyte fuel cell according to claim 11 wherein the solid electrolyte comprises yttria-stabilized zirconia.

* * * * *